May 24, 1927.   
R. CAUT   
1,630,168   
POWER TRANSMISSION BY HYDRAULIC MEANS   
Filed March 31, 1921   2 Sheets-Sheet 2

Inventor:
R. Caut,
By Marto Caut
Attys

Patented May 24. 1927.

UNITED STATES PATENT OFFICE.

1,630,168

RAYMOND CAUT, OF CLICHY, FRANCE.

POWER TRANSMISSION BY HYDRAULIC MEANS.

Application filed March 31, 1921, Serial No. 457,468, and in France February 25, 1920.

(GRANTED UNDER THE PROVISIONS OF THE ACT OF MARCH 3, 1921, 41 STAT. L., 1313.)

The present invention relates to an apparatus for automatically regulating the speed through the resistant couple, for the hydraulic transmission of power.

Hydraulic power transmissions are now known in which a heat motor of any type actuates a pump mounted on a closed circuit comprising a receiver, said pump setting in circulation a liquid contained in said circuit, which transmits to the receiver the energy furnished by the heat motor.

In such transmissions the rate of rotation of the receiver depends on the feed of the pump actuated by the motor; if the speed of this motor is constant, the feed of the pump, and consequently the angular speed of the receiver, depends on the travel of the pistons. On the other hand, the travel of the pistons depends obviously on the eccentricity of the crank pin of the crankshaft actuating these pistons; there are also devices by means of which the eccentricity can be varied at will between zero and a determined maximum.

The device forming the subject of the invention is intended particularly for the purpose of causing the automatic variation of the eccentricity of the crank pin operating as a resistant couple, so that the resistant force will always be less than the determined maximum. This arrangement is applied specifically to pumps in which the crank pin may be put out of center for a greater or less extent by the rotation of a screw having a steep pitch, caused by the translation (transmission) with respect thereto of a movable slide, which, however, is not rotatable with respect to the screw.

The apparatus forming the subject of the invention is characterized in that the slide forming the nut of the steep-pitched screw is integral with a piston moving in a cylinder which it divides into two chambers, one of which is filled with a constant mass of elastic fluid, and the other being connected, by means of a tube system, with the discharge passage of the pump.

Consequently, in order that the system or apparatus be balanced, it is necessary that at each instant the pneumatic pressure be equal to the pressure transmitted by the fluid or liquid which the pump operates when this latter pressure varies the piston moves until equilibrium is re-established; the slide-nut moves at the same time and thus causes the automatic variation of the eccentricity of the crank pin of the pump by reason of the pumping pressure. But it is apparent that this pressure is itself a resistant couple function applied on the receiver (driven) shaft; consequently, the above characterized arrangement permits of automatically varying the speed of the receiver (shaft) as a function of the resistant couple.

The accompanying drawing shows, by way of example, an embodiment of the invention applied to a known type of hydraulic transmission, the pump actuated by the heat motor being shown only to facilitate the description and explain it.

Figure 1:
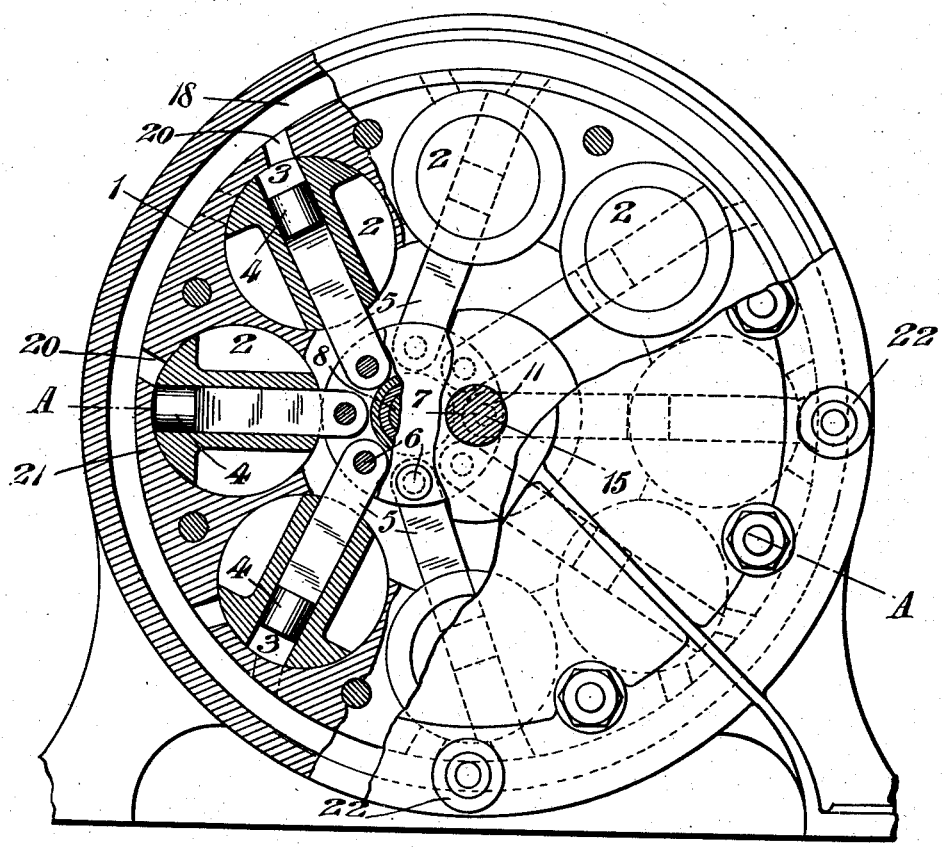
Fig. 1 is a front elevation partly in section of a known type of pump with oscillating casings or barrels.

The pump shown consists essentially of an annular body 1 comprising a circumferential series of cylindrical seats in which casings 2 rotate. Each casing is provided with a cylindrical bore 3, in which a piston head 4 operates. A rod 5 is rigidly connected with each piston head. The several rods 5 are pivoted at the inner ends thereof by pins 6 and are arranged in a circular series in a groove of a sleeve 7 adapted to rotate freely about a crank pin 8, the trunnions 11, 12, of which rotate in the bearings 13, 14.

The body 1 is mounted between two plates 15, 16 the latter being formed with central openings for receiving the bearings 13 and 14. The body 1 is also provided with two annular recesses 18, 19 on the periphery thereof leaving a dividing web 17, while the recesses are closed by the rings 18' and 19'.

Each cavity 18, 19 communicates with each cylindrical seat of the casings 2 through two oblique passages 20, 21, emptying into said seats at a distance from each other equal to the diameter of the opening 3, in order not to communicate directly with each other and that one thereof may always be closed by the circumferential periphery of the casing 2.

The cavities 18 and 19 thus form two collectors uniting all the passages 20 or 21 located on the same side of the apparatus. Opposite each of these collectors and on the external part of each plate 15, 16 are arranged four perforated bosses 22 permitting of connecting each collector, through one or more branches, with the intake and exhaust passages.

In order to permit of the regulation of the eccentricity of the crank pin 8, the trunnions of the crankshaft are provided inside the casing of the pump with plates 40, 41, on each of which are pivoted one of the ends of a lever 42, 43, these levers being connected to each other by means of the crank pin 8, the radius of eccentricity of which it is desired to render variable.

Mounted at the center of the two plates 40, 41 are discs 44, 45 which are integral with an eccentric rod 46 passing through the crank pin 8 longitudinally into a recess 47 provided across the latter. This recess is made in such manner that the eccentric rod 46 may carry along the pin 8, with the two levers 42, 43 which it carries, the latter rotating then with their respective pivotal axes 48, 49.

The disc 44 of the eccentric rod 46 is integrally united with a steep-pitched screw 23 on which is screwed a nut 24, the outer periphery of which is square and is engaged by easy friction in an opening of the same form provided in the trunnion 11, so that this nut is capable of movement only with respect to the screw 23.

It is apparent that translation (movement) of the nut 24 causes rotation of the screw 23, and hence, the displacement or movement of the eccentric rod 46. This movement determines the rotation of the lever 42 about the axis 48, and consequently that of the lever 43 about the axis 49. Consequently the crank pin 8 is more or less put out of center, as shown on Fig. 3.

As has been stated, the invention consists in an apparatus for automatically controlling the movement of the nut 24.

Said nut 24 partakes in the rotation of the trunnion 11; a projection 11ᵃ receives a ball bearing 25 integral with a piston 26 which slides in a cylinder 27, and forms there two chambers, one of which 27ᵃ is constantly filled with air, and the other of which 27ᵇ is connected with the exhaust tube system of the pump.

Figures 2, 3:
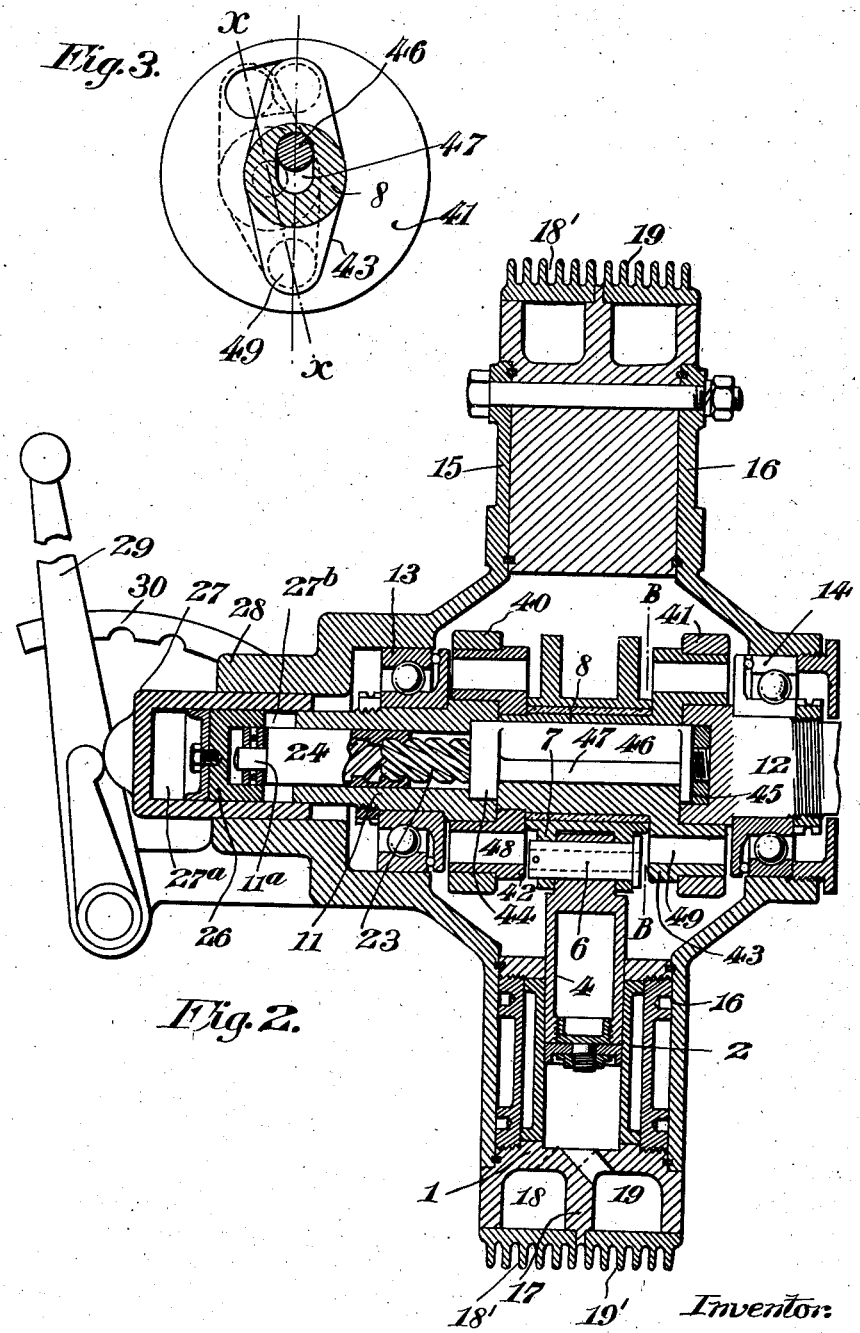
Fig. 2 is a transverse section on the line 2—2 of Fig. 1, showing the regulating apparatus in accordance with the invention.
Fig. 3 is a sectional detail on the line 3—3 of Fig. 2.

The initial pressure in the chamber 27ᵃ is greater than the passive resistance of the elements, so that it tends to move the nut 24 so as to bring the crank pin 8 into the position of maximum eccentricity, that is to say, along the axis x—x of Fig. 3. When the resistance increases the pressure on expulsion or exhaust increases and, as this pressure prevails in chamber 27ᵇ, it moves the piston 26 by compressing the air contained in the chamber 27ᵃ and decreasing the eccentricity of the crank pin 8. Balance or equilibrium is established when the pnuematic pressure or air becomes equal to the hydraulic pressure, and it is apparent that the reverse phenomena are produced when the resistance decreases.

In order to limit the speed so as not to exceed a predetermined value, it is possible, according to the invention, to vary the initial tension of the compressible fluid in the chamber 27ᵃ. For this purpose the cylinder is made movable and slides in a bore of a boss 28 of the flange 15; the position of the cylinder 27 is determined by the angular position of the lever 29 which is combined with a locking sector 30. By this means it is possible to vary the capacity of the compressed air chamber 27ᵃ and consequently the initial tension of the fluid contained therein.

It is apparent that the apparatus of the invention may be applied to types of pumps other than that represented, and in general to all piston pumps.

What I claim as my invention and desire to secure by Letters Patent is:

1. In a pump the combination with the crank pin thereof, of a slide for controlling the eccentricity of the pin including a screw having a steep pitch directly connected with the end of the crank pin and an internally threaded sleeve operating on the screw, a slidably mounted tight cylinder, a piston head connected with the sleeve and dividing the cylinder into two chambers, one of which is adapted to contain a non-compressible fluid and the other air, a pivotally mounted lever, a stop carried with the lever and bearing against the outer end of the cylinder and a locking sector with which the lever is associated.

2. In a pump of the character described, a casing, a crank pin, a screw having a steep pitch connected to one end of the crank pin, a correspondingly and internally threaded sleeve associated with the screw, a tight cylinder slidably mounted in a portion of the casing of the pump, a piston head swivelly connected to the sleeve and operating in the cylinder and dividing the same into two chambers, one of which is adapted to contain a non-compressible fluid and the other air, a manually operable controlling lever pivoted to the pump casing, a sector carried by the pump casing with which the lever is associated and a stop carried with the lever and bearing against the outer end of the tight cylinder, substantially as and for the purposes set forth.

3. In a pump of the type described the combination with the crank pin of the pump, of a slide for controlling the eccentricity of the crank pin, a piston arranged in substantial longitudinal alignment with the slide, means directly connecting said piston with said slide, a tight cylinder slidably mounted in a portion of the casing of the pump and divided into two chambers by the piston, one of said chambers being filled with a non-compressible fluid, and means for connecting the other chamber with the discharge of the pump.

4. In a pump of the character described the combination with the crank pin thereof, of a slide for controlling the eccentricity of the crank pin, a piston arranged in substantial longitudinal alignment with the slide and connected thereto, a tight cylinder slidably mounted in a portion of the pump casing for receiving the piston and the portion of the slide, a piston dividing the cylinder into two compartments one of which is filled with a non-compressible fluid, means for causing a variation of the initial pressure of said fluid, and means connecting the other compartment with the exhaust passage of the pump.

5. In a pump of the character described the combination with a crank pin thereof, of a slide movable longitudinally with respect to the axis of the crank pin for controlling the eccentricity thereof, a piston arranged in substantial longitudinal alignment with the slide, means for directly connecting the piston to the slide, a tight cylinder slidably mounted in a portion of the casing of the pump and housing the piston and a portion of the slide, the piston dividing the cylinder into two chambers one of which is filled with a non-compressible fluid, a lever pivoted on the pump casing, a stop member integral with said lever and bearing against said cylinder, means for locking the lever in position, and means for connecting the other chamber of the cylinder to the discharge passage of the pump.

In testimony whereof I have signed my name to this specification.

RAYMOND CAUT.